United States Patent
Noda et al.

(10) Patent No.: US 9,274,605 B2
(45) Date of Patent: Mar. 1, 2016

(54) INFORMATION PROCESSING DEVICE, INFORMATION PROCESSING METHOD, AND PROGRAM

(75) Inventors: Takuro Noda, Tokyo (JP); Akihiro Komori, Tokyo (JP); Nariaki Satoh, Kanagawa (JP); Osamu Shigeta, Tokyo (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 356 days.

(21) Appl. No.: 13/198,628

(22) Filed: Aug. 4, 2011

(65) Prior Publication Data

US 2012/0050270 A1  Mar. 1, 2012

(30) Foreign Application Priority Data

Aug. 31, 2010 (JP) ................................. 2010-194109

(51) Int. Cl.
 G06T 15/00 (2011.01)
 G06F 3/01 (2006.01)
 G06F 3/0481 (2013.01)
 H04N 13/00 (2006.01)

(52) U.S. Cl.
 CPC ............ *G06F 3/017* (2013.01); *G06F 3/04815* (2013.01); *H04N 13/0022* (2013.01)

(58) Field of Classification Search
 CPC ...................................................... G06T 15/00
 USPC ........................................................ 345/419
 See application file for complete search history.

(56) References Cited

U.S. PATENT DOCUMENTS

| | | | | |
|---|---|---|---|---|
| 6,023,275 A | * | 2/2000 | Horvitz et al. ............... | 715/700 |
| 6,070,176 A | * | 5/2000 | Downs et al. ................ | 715/234 |
| 2001/0006382 A1 | * | 7/2001 | Sevat .......................... | 345/169 |
| 2003/0043145 A1 | * | 3/2003 | Thompson ................... | 345/419 |
| 2006/0156228 A1 | * | 7/2006 | Gallo et al. .................. | 715/523 |
| 2006/0187196 A1 | | 8/2006 | Underkoffler et al. | |
| 2007/0013716 A1 | * | 1/2007 | Kjeldsen et al. ............. | 345/594 |
| 2007/0216894 A1 | | 9/2007 | Garcia et al. | |
| 2008/0307365 A1 | * | 12/2008 | Louch et al. ................. | 715/838 |
| 2010/0211872 A1 | * | 8/2010 | Rolston et al. ............... | 715/702 |
| 2011/0179368 A1 | * | 7/2011 | King et al. ................... | 715/769 |

FOREIGN PATENT DOCUMENTS

| | | |
|---|---|---|
| JP | 2008-530661 | 8/2008 |
| JP | 2009-528514 | 8/2009 |
| JP | 2009-265258 | 11/2009 |

* cited by examiner

*Primary Examiner* — Peiyong Weng
(74) *Attorney, Agent, or Firm* — Paratus Law Group, PLLC

(57) ABSTRACT

There is provided an information processing device including a display control section configured to display objects in a virtual three-dimensional space, the virtual three-dimensional space including a depth direction of a display screen and having a center region and a peripheral region located around the center region, and an acquisition section configured to acquire an operation on the objects at least in the depth direction based on a movement of a body of a user. The range of the depth direction in which the objects are displayed is set to a first range in the center region and to a second range narrower than the first range in the peripheral region.

20 Claims, 12 Drawing Sheets

FIG. 1
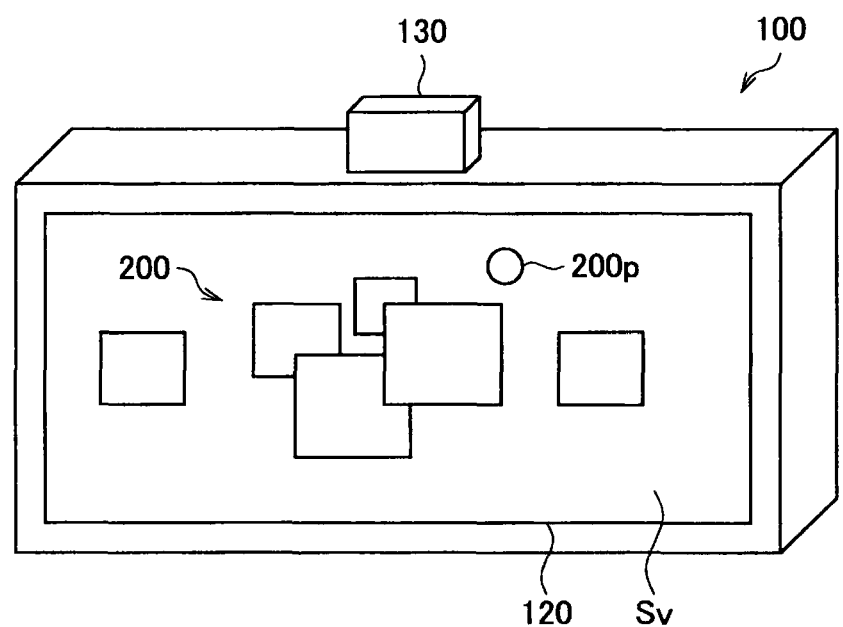
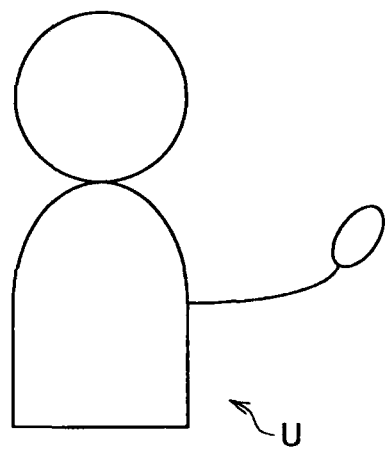
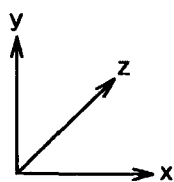

FIG. 4
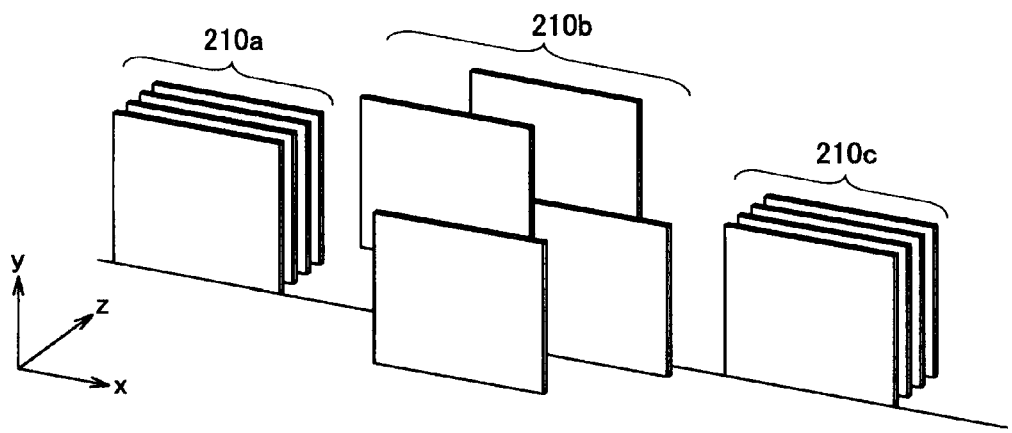
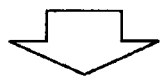
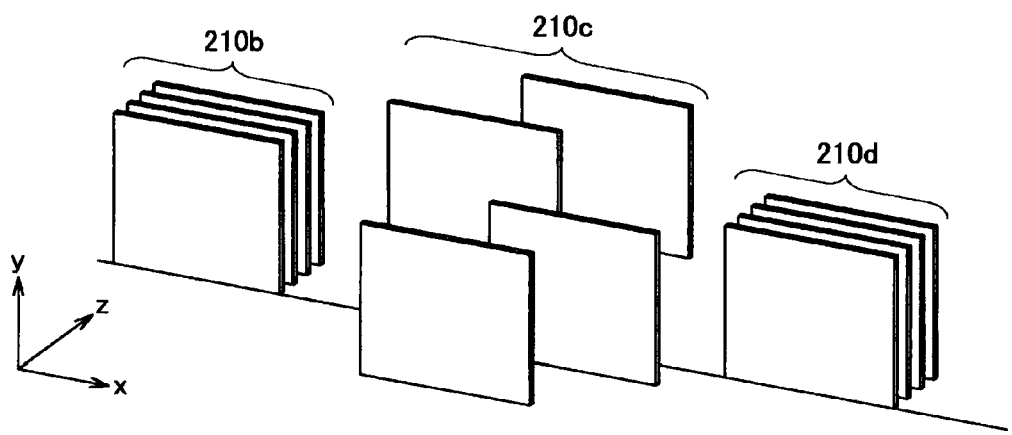

INFORMATION PROCESSING DEVICE, INFORMATION PROCESSING METHOD, AND PROGRAM

BACKGROUND

The present disclosure relates to an information processing device, an information processing method, and a program. In particular, the present disclosure relates to an information processing device, an information processing method, and a program for acquiring an operation instruction based on a movement of the body of a user.

In recent years, GUIs (Graphical User Interfaces) provided to users via display screens have been more commonly displayed as virtual three-dimensional spaces. In a virtual three-dimensional space, objects such as content can be arranged not only in the horizontal direction and the vertical direction of the display screen, but also in the depth direction of the display screen. Therefore, on a GUI displayed as a virtual three-dimensional space, a space in the display screen can be effectively used. As an example of such technologies, JP 2009-265258A discloses a technology of displaying a plurality of objects by superimposing them in the depth direction in order according to the operations of a user.

As a GUI is displayed as a virtual three-dimensional space, operation instructions are more commonly acquired based on movements of the body of a user. For example, a body part such as a hand of a user is recognized through an image analysis or the like using a marker attached to the user, a controller gripped by the user, or speckle patterns. Further, the position of the recognized body part is identified using a three-dimensional measurement method such as triangulation or TOF (Time Of Flight) so that a movement of the body of the user is acquired. As an example of such technologies, JP 2009-528514A discloses a technology of using a gesture of a user, which has been identified through an image analysis using speckle patterns, as an input to a computer application. In addition, JP 2008-530661A discloses a technology of mapping a physical space in which a user exists onto a virtual space on a system and reflecting a movement of the user acquired in the physical space into a cursor control.

SUMMARY

However, a movement of a user is restricted by the structure of the human body. Therefore, when a GUI is provided as a virtual three-dimensional space as disclosed in JP 2009-265258A and a movement of the body of a user is further used as an operation instruction as disclosed in JP 2009-528514A and JP 2008-530661A, there is a problem in that an operation instruction for the depth direction may be difficult to be issued depending on a region of the three-dimensional space.

In light of the foregoing, it is desirable to provide an information processing device, an information processing method, and a program, which are novel and improved, and which can induce a user to perform an operation in the depth direction in a region that is suited to an operation in the depth direction through a movement of his/her body.

According to an embodiment of the present disclosure, there is provided an information processing device including a display control section configured to display objects in a virtual three-dimensional space, the virtual three-dimensional space including a depth direction of a display screen and having a center region and a peripheral region located around the center region, and an acquisition section configured to acquire an operation on the objects at least in the depth direction based on a movement of a body of a user. The range of the depth direction in which the objects are displayed is set to a first range in the center region and to a second range narrower than the first range in the peripheral region.

The peripheral region may be set on one or both side of the center region in a horizontal direction of the display screen.

The virtual three-dimensional space may have a middle region between the center region and the peripheral region. The range of the depth direction in which the objects are displayed in the middle region may be set between the first range and the second range.

The range of the depth direction in which the objects are displayed in the middle region may be set such that the range changes in stages between the first range and the second range.

The range of the depth direction in which the objects are displayed in the middle region may be set such that the range changes continuously between the first range and the second range.

The second range may be set to zero.

The information processing device may further include a notification section configured to notify the user that an operation in the depth direction on the objects located in the peripheral region has been acquired.

The display control section may display the objects arranged in the center region such that the objects are spread more in a horizontal direction or a vertical direction of the display screen than the objects arranged in the peripheral region.

The display control section may display the objects arranged in the peripheral region such that the objects are spread more in the vertical direction of the display screen than the objects arranged in the center region.

The acquisition section may acquire a position of the user with reference to the display screen, and the center region may be set as a region corresponding to the position of the user.

The number of the center region may be set to more than one when the number of the user is more than one.

According to another embodiment of the present disclosure, there is provided an information processing method including displaying objects in a virtual three-dimensional space, the virtual three-dimensional space including a depth direction of a display screen and having a center region and a peripheral region located around the center region, and acquiring an operation on the objects at least in the depth direction based on a movement of a body of a user. The range of the depth direction in which the objects are displayed may be set to a first range in the center region and to a second range narrower than the first range in the peripheral region.

According to still another embodiment of the present disclosure, there is provided a program for causing a computer to execute the processes of displaying objects in a virtual three-dimensional space, the virtual three-dimensional space including a depth direction of a display screen and having a center region and a peripheral region located around the center region, and acquiring an operation on the objects at least in the depth direction based on a movement of a body of a user. The range of the depth direction in which the objects are displayed may be set to a first range in the center region and to a second range narrower than the first range in the peripheral region.

According to the embodiments of the present disclosure described above, it is possible to induce a user to perform an operation in the depth direction in a region that is suited to an operation in the depth direction through a movement of his/her body.

BRIEF DESCRIPTION OF THE DRAWINGS

FIG. 1 is a diagram showing a schematic configuration of an information processing device in accordance with the first embodiment of the present disclosure;

FIG. 4 is a diagram illustrating a display of objects with the information processing device in accordance with the first embodiment;

DETAILED DESCRIPTION OF THE EMBODIMENTS

Figure 2:
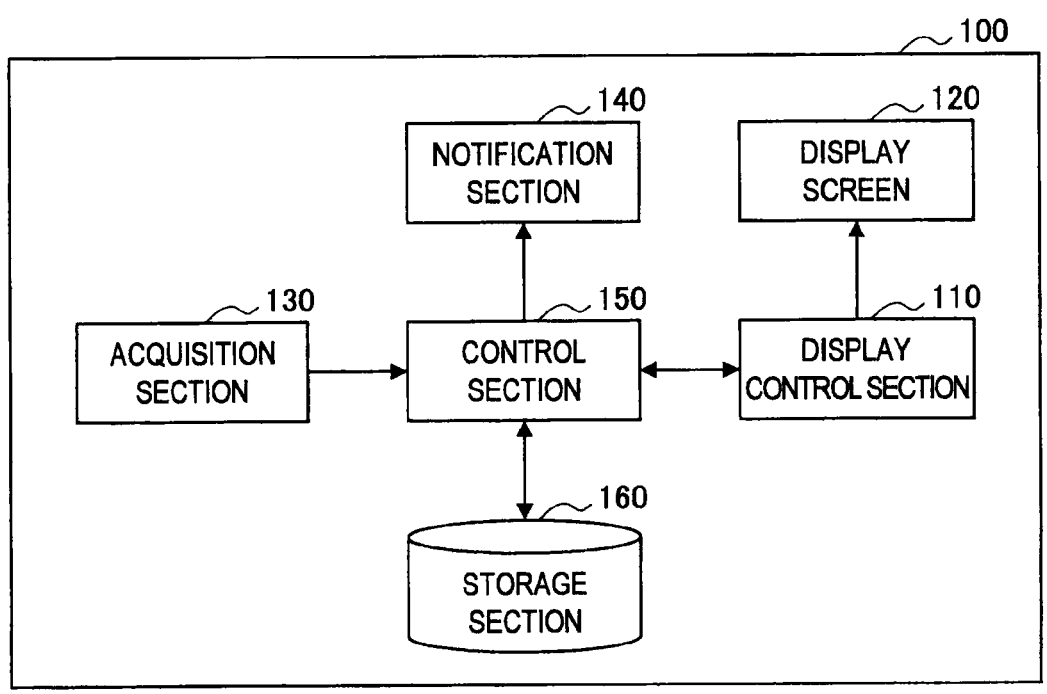
FIG. 2 is a block diagram showing the function and configuration of the information processing device in accordance with the first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. First Embodiment
1-1. Configuration of Information Processing Device
1-2. Display of Objects
1-3. Variation
2. Second Embodiment
2-1. Display of Objects
2-2. Variation
3. Third Embodiment
4. Conclusion

1. First Embodiment

1-1. Configuration of Information Processing Device

First, the configuration of an information processing device in accordance with the first embodiment of the present disclosure will be described with reference to FIGS. 1 and 2.

FIG. 1 is a diagram showing a schematic configuration of an information processing device 100 in accordance with the first embodiment of the present disclosure. Referring to FIG. 1, the information processing device 100 is a PC (Personal Computer) or a television, for example, and includes a display screen 120 and an acquisition section 130. The display screen 120 displays a virtual three-dimensional space Sv in which objects 200 are arranged. The acquisition section 130 acquires an operation of the user U on the object 200 from a movement of the body of the user U.

The display screen 120 is a display such as, for example, a LCD (Liquid Crystal Display), a PDP (Plasma Display Panel), or an organic EL (Electro-Luminescence) panel. The display screen 120 can be a display that displays a planar image or a display that displays a stereoscopic image. A display method used when the display screen 120 displays a stereoscopic image can be any method such as, for example, a method that uses a parallax barrier or a frame sequential method. The display screen 120 can be integrated with the information processing device 100 and provided on the surface thereof as shown, or provided outside and independently of the information processing device 100.

The virtual three-dimensional space Sv is displayed on the display screen 120. In this embodiment, three directions that are shown as the x-axis direction, the y-axis direction, and the z-axis direction are defined in the virtual three-dimensional space Sv. The x-axis direction, the y-axis direction, and the z-axis direction correspond to the horizontal direction, the vertical direction, and the depth direction, respectively, of the display screen 120. The objects 200 are displayed in the virtual three-dimensional space Sv. The objects 200 can include, for example, a pointer object 200p to be operated by the user U and content objects other than that. A display of the objects 200 in accordance with this embodiment is described below.

The acquisition section 130 acquires an operation on the object 200 at least in the z-axis direction based on a movement of the body of the user U. In this embodiment, the acquisition section 130 acquires an operation based on a movement of a hand that is a body part of the user U. Any method can be used as a method for recognizing a body part of the user U such as, for example, a method using a marker attached to the user U, a method using a controller gripped by the user U, or an image analysis using speckle patterns. Further, any method can be used as a method for identifying the position of the recognized body part of the user U such as, for example, a three-dimensional measurement method such as triangulation or TOF. In order to acquire an operation from a movement of the body of the user U, the acquisition section 130 can include a camera or infrared emitting and receiving portions, for example. Further, the acquisition section 130 can acquire the position of the user U with reference to the display screen 120 using, for example, a method that is similar to the method for acquiring the position of a body part that is used by the user U to perform an operation.

Herein, the acquisition section 130 can be disposed such that it faces a direction corresponding to the direction of the display screen 120 as shown. In that case, the user U can easily correlate a direction in the virtual three-dimensional space Sv with the actual direction, and thus can easily operate the objects 200 by moving his/her body in front of the acquisition section 130.

Using the aforementioned information processing device 100, the user U causes the acquisition section 130 to acquire a movement of his/her body, and moves the object 200 displayed on the display screen 120. For example, the user U can move the pointer object 200p by moving his/her hand in the horizontal direction, the vertical direction, and the front-back direction, and can cause the pointer object 200p to select and deselect another object 200 through operations of clenching and unclenching the hand. Herein, movements of the hand of the user U in the horizontal direction, the vertical direction, and the front-back direction correspond to movements of the pointer object 200p in the virtual three-dimensional space Sv in the x-axis direction, the y-axis direction, and the z-axis direction, respectively.

In this case, the user U moves his/her hand in the front-back direction in front of the acquisition section 130 to move the pointer object 200p in the z-axis direction. For example, when the pointer object 200p is located around the center of the virtual three-dimensional space Sv, the user U moves his/her hand around the front part of the body. Meanwhile, when the pointer object 200p is located around the horizontal end of the virtual three-dimensional space Sv, the user U moves his/her hand in the front-back direction while stretching the arm horizontally. Herein, it would be difficult to move the hand in the front-back direction while stretching the arm in the horizontal direction due to the structure of the human body. Thus, when the pointer object 200p is located at the horizontal end of the virtual three-dimensional space Sv, it would be difficult for the user U to move the pointer object 200p in the z-axis direction. Thus, the information processing device 100 displays the objects 200 in a manner described below to induce the user U such that he/she will not need to operate the pointer object 200p, which is located at the horizontal end of the virtual three-dimensional space, in the z-axis direction.

Although the description has been made above of a case in which the user U uses the pointer object 200p to operate the object 200, the pointer object 200p need not necessarily be displayed, and in such a case, each object 200 can be directly operable by the user U.

FIG. 2 is a block diagram showing the function and configuration of the information processing device 100 in accordance with the first embodiment of the present disclosure. Referring to FIG. 2, the information processing device 100 includes the display control section 110, the display screen 120, the acquisition section 130, a notification section 140, a control section 150, and a storage section 160. As described above, the information processing device 100 can be a PC (Personal Computer) or a television, for example. Each of the aforementioned components of the information processing device 100 need not necessarily be included in a single chassis. For example, the display screen 120 can be provided outside and independently of the information processing device 100. Further, the storage section 160 need not be included in the information processing device 100, and in such a case, the function of the storage section 160 can be provided by storage on a network, for example. The display screen 120 and the acquisition section 130 have been described above with reference to FIG. 1. Thus, detailed description thereof is omitted herein.

The display control section 110 causes the display screen 120 to display the virtual three-dimensional space Sv and the objects 200 arranged in the virtual three-dimensional space Sv as a planar image or a stereoscopic image. The display control section 110 is an arithmetic processing device for displaying an image, and can be implemented by a GPU (Graphics Processing Unit), a CPU (Central Processing Unit), or a DSP (Digital Signal Processor), for example. The display control section 110 can operate in accordance with a program stored in the storage section 160. The display control section 110 displays the virtual three-dimensional space Sv as a space having a center region and peripheral regions around the center region. In addition, the display control section 110 sets the range of the z-axis direction, in which the objects 200 are displayed in the virtual three-dimensional space Sv, to a first range in the center region and to a second range narrower than the first range in the peripheral regions. The regions set in the virtual three-dimensional space Sv and the range in which the objects 200 are displayed in each region are described below.

The notification section 140 notifies the user U that the acquisition section 130 has acquired an operation on one or more objects 200, which is/are located in the peripheral region of the virtual three-dimensional space Sv, in the depth direction. The notification section 140 can give notification to the user U using a sound such as, for example, a warning beep. In such a case, the notification section 140 can be implemented by an audio output device such as, for example, a speaker, and can output a sound such as a warning beep under the control of the control section 150. Alternatively, the notification section 140 can give notification to the user U by changing the display such as by changing the color of the virtual three-dimensional space Sv or the objects 200 on the display screen 120 or shaking the display. In such a case, the notification section 140 can be implemented as a part of a CPU or a DSP, for example, and can change the display of the display screen 120 via the display control section 110. Besides, the notification section 140 can also give notification to the user U when the pointer object 200p has entered the peripheral region Rs.

The control section 150 controls the operation of each section of the information processing device 100. The control section 150 can be implemented by, for example, a CPU or a DSP, and can operate in accordance with a program stored in the storage section 160. The programs for implementing the functions of the display control section 110 and the control section 150 can be provided to the information processing device 100 by being stored in a removable storage medium such as a disc storage medium or a memory card, or by being downloaded to the information processing device 100 via a network such as a LAN (Local Area Network) or the Internet.

The storage section 160 stores data used for the processing in the information processing device 100. The storage section 160 can be a storage device such as, for example, RAM (Random Access Memory) or ROM (Read Only Memory). Alternatively, the storage section 160 can be a removable storage medium such as an optical disc, a magnetic disk, or semiconductor memory, or can be a combination of a storage device and a removable storage medium. The storage section 160 can store a program for implementing the function of, for example, the display control section 110 or the control section 150 by being executed by a CPU or a DSP.

1-2. Display of Objects

Next, a display of the objects by the information processing device in accordance with the first embodiment of the present disclosure will be described with reference to FIGS. 3 and 4.

Figure 3:
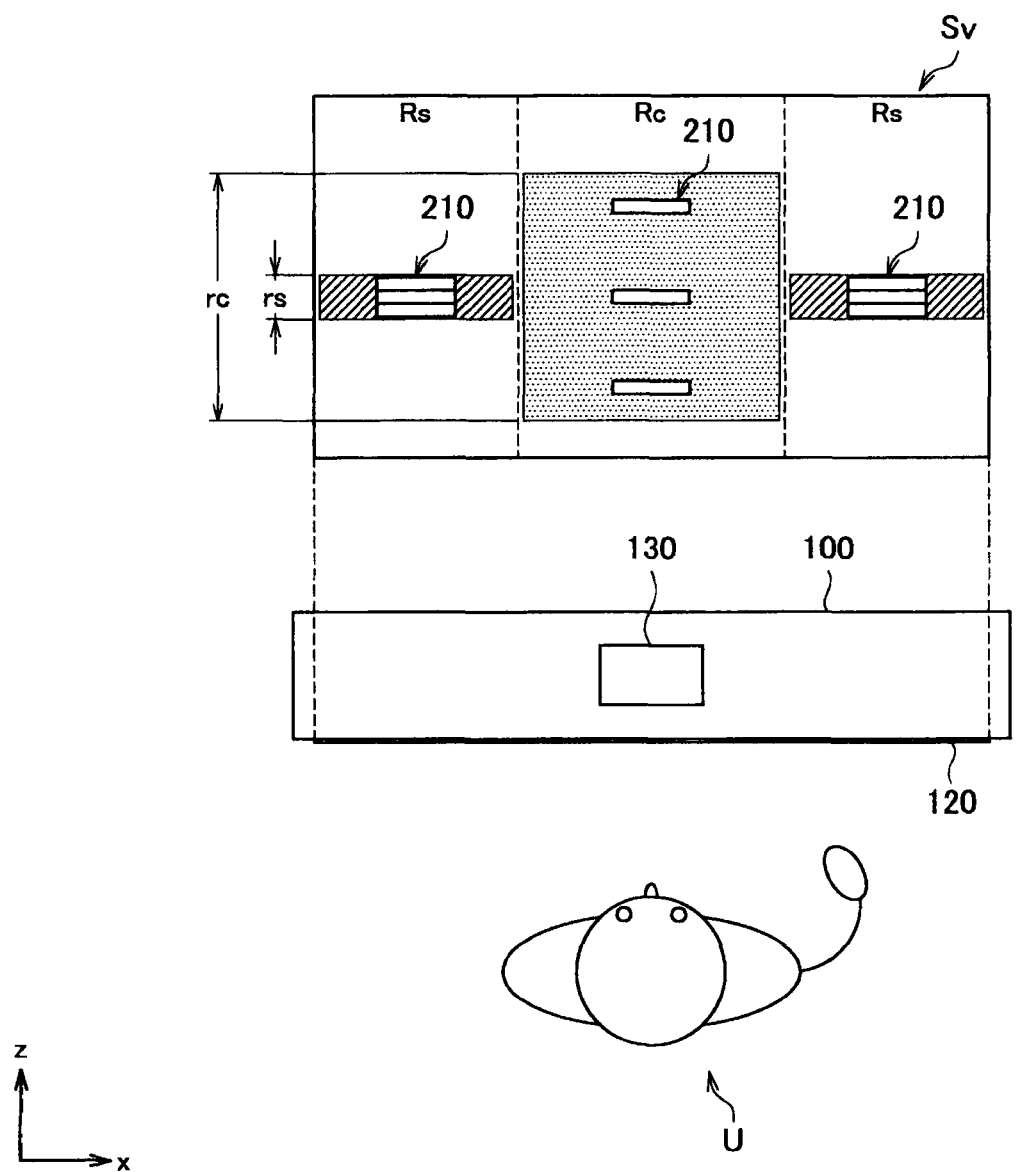
FIG. 3 is a diagram illustrating a display of objects with the information processing device in accordance with the first embodiment.

FIG. 3 is a schematic top view showing a display of the objects 200 with the information processing device 100 in accordance with the first embodiment of the present disclosure. Referring to FIG. 3, the virtual three-dimensional space Sv displayed on the display screen 120 includes a center region Rc located at about the center of the virtual three-dimensional space Sv and two peripheral regions Rs located on the opposite sides of the center region Rc in the horizontal direction. The range of the z-axis direction in which the objects 200 are displayed in the virtual three-dimensional space Sv is a first range rc in the center region Rc and a second range rs in the peripheral regions Rs. Herein, the second range rs is narrower than the first range rc.

As the center region Rc and the peripheral regions Rs are set in the virtual three-dimensional space Sv and the first range rc and the second range rs are set for the respective regions as described above, when an object group 210, which is a set of a plurality of objects 200, is arranged in each of the center region Rc and the peripheral regions Rs as in the example shown in the drawing, the object group 210 located in the center region Rc is spread more in the z-axis direction, namely, the depth direction than the object groups 210 located in the peripheral regions Rs. That is, the object group 210 located in the center region Rc is displayed such that the user U will feel a sense of depth than for the object groups 210 located in the peripheral regions Rs.

In this case, as the objects 200 in the center region Rc are arranged such that they are spread in the z-axis direction and the range in which the objects 200 can be moved in the z-axis direction by an operation is wide, the user U is induced to operate the objects 200 in the z-axis direction. Meanwhile, as the objects 200 in the peripheral regions Rs are arranged such that they are closed in the z-axis direction and the range in which the objects 200 can be moved in the z-axis direction by an operation is narrow, the user U is induced not to operate the objects 200 in the z-axis direction. With such arrangement of the objects 200, it is possible to eliminate the need for the user U to operate the objects 200 in the peripheral regions Rs, in which an operation instruction for the z-axis direction is relatively difficult to be issued by a movement of a hand in the front-back direction, in the z-axis direction.

When the display screen 120 displays a stereoscopic image and if the objects 200 located in the peripheral region Rs are arranged such that they are spread in the z-axis direction, an image that provides a sense of depth will be displayed stereoscopically in areas around the ends of the display screen 120. Such a display, however, can increase a burden on the visual perception of the user U. Thus, by displaying the objects 200 in the peripheral regions Rs such that they are closed in the z-axis direction, it becomes possible to ease a burden on the visual perception of the user U that would otherwise be caused by a stereoscopic image displayed on the display screen 120.

Herein, the second range rs can be set to zero as shown. In such a case, the objects 200 located in the peripheral regions Rs are displayed substantially in the same position in the z-axis direction. That is, the objects 200 in the peripheral regions Rs are arranged two-dimensionally in the x-axis direction and the y-axis direction. In this case, the control section 150 can disable an operation, which has been acquired by the acquisition section 130, on the objects 200 located in the peripheral regions Rs in the z-axis direction. Further, the control section 150 can control the notification section 140 to notify the user U that an invalid operation or an unrecommended operation has been acquired, for example.

FIG. 4 is a schematic perspective view showing a display of the objects 200 with the information processing device 100 in accordance with the first embodiment of the present disclosure. FIG. 4 shows a state before a change, specifically, a state in which object groups 210a to 210c are displayed in the virtual three-dimensional space Sv and a state after the change, specifically, a state in which object groups 210b to 210d are displayed. Herein, the display control section 110 displays the objects 200 arranged in the center region Rc such that they are spread more in the x-axis direction or the y-axis direction than the objects 200 arranged in the peripheral regions Rs.

In this embodiment, the objects 200 can be content objects that represent content of images, music, or the like. In this case, the user U operates each content object by moving, selecting, or playing back the content object, for example.

The object group 210b in the state before the change is the object group located in the center region Rc of the virtual three-dimensional space Sv. In addition, the object group 210a and the object group 210c are the object groups located in the peripheral regions Rs of the virtual three-dimensional space Sv. The object group 210b is arranged such that it is spread in the z-axis direction, while the object group 210a and the object group 210c are arranged such that they are closed in the z-axis direction. In addition, in the example shown in the drawing, the object group 210b is arranged such that it is also spread in the x-axis direction and the y-axis direction, while the object group 210a and the object group 210c are arranged such that they are also closed in the x-axis direction and the y-axis direction.

The aforementioned arrangement can be used when, for example, the object group 210b is used as an active object group and the object group 210a and the object group 210c are used as inactive object groups. In such a case, it is possible to perform an operation of, for example, interchanging the display positions of or playing back the objects 200 spread in the x-axis direction, the y-axis direction, and the z-axis direction in the object group 210b that is an active object group. Meanwhile, such an operation can be disabled for the object group 210a and the object group 210c that are inactive object groups.

Herein, when the user U desires to perform an operation of interchanging the display positions of or playing back the objects 200 in the object group 210c that is an inactive object group, for example, the user U selects the object group 210c and drags it in the negative direction of the x-axis, that is, to the left of the display screen 120. Then, the objects 200 arranged in the virtual three-dimensional space Sv are displayed in the state after the change as shown. In such a state, as the object group 210a has moved to the outside of the display valid region of the display screen 120, the object group 210a is not displayed any more. The object group 210b has moved from the center region Rc to the peripheral region Rs of the virtual three-dimensional space Sv. Thus, the object group 210b is displayed such that it is closed in the x-axis direction, the y-axis direction, and the z-axis direction. The object group 210c has moved from the peripheral region Rs to the center region Rc of the virtual three-dimensional space Sv. Thus, the object group 210c is displayed such that it is spread in the x-axis direction, the y-axis direction, and the z-axis direction. The object group 210d has moved from the outside of the display valid region of the display screen 120. Thus, the object group 210d is located in the peripheral region Rs of the virtual three-dimensional space Sv and is displayed such that it is closed in the x-axis direction, the y-axis direction, and the z-axis direction.

1-3. Variation

Next, a variation of a display of the objects with the information processing device in accordance with the first embodiment of the present disclosure will be described with reference to FIGS. 5 and 7.

Figure 5:
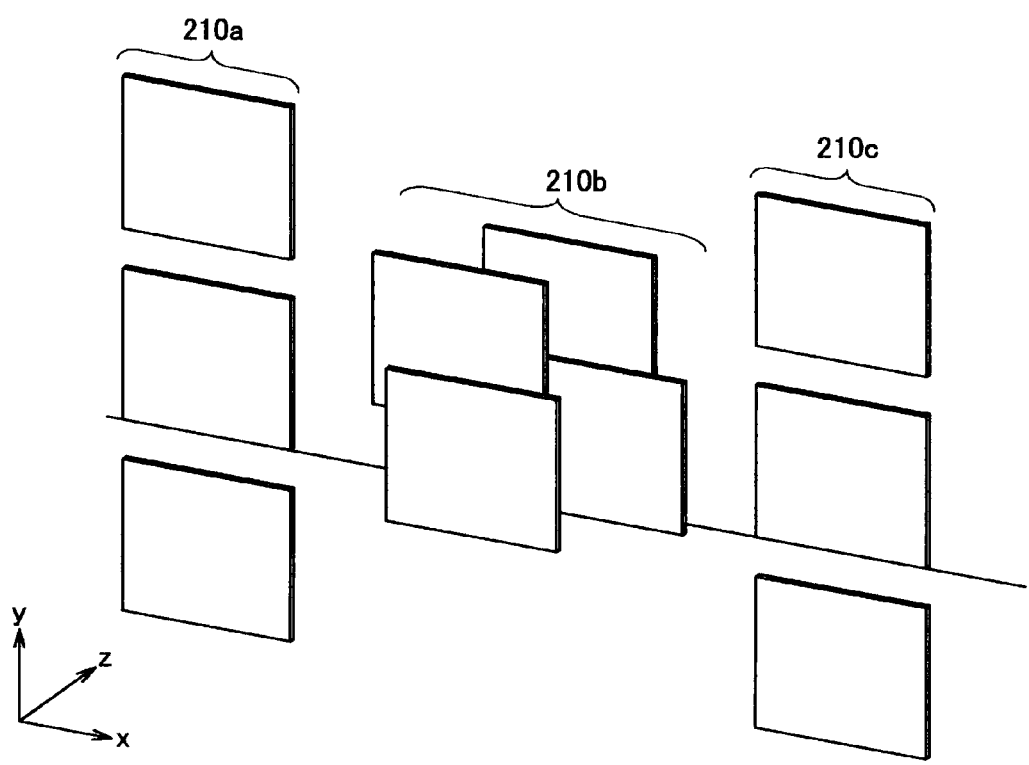
FIG. 5 is a diagram illustrating a variation of a display of objects with the information processing device in accordance with the first embodiment.

FIG. 5 is a schematic perspective view showing a variation of a display of the objects 200 with the information processing device 100 in accordance with the first embodiment of the present disclosure. FIG. 5 shows a state in which the object groups 210a to 210c are displayed in the virtual three-dimensional space Sv. Herein, the display control section 110 displays the objects 200 arranged in the peripheral regions Rs such that they are spread more in the y-axis direction than the objects 200 arranged in the center region Rc.

In the example shown in the drawing, the object group 210b is the object group located in the center region Rc of the virtual three-dimensional space Sv. Meanwhile, the object group 210a and the object group 210c are the object groups located in the peripheral regions Rs of the virtual three-dimensional space Sv. The object group 210b is arranged such that it is spread in the z-axis direction, while the object groups 210a and the object groups 210c are arranged such that they are closed in the z-axis direction. The object group 210b is arranged such that it is also spread in the x-axis direction and the y-axis direction. Meanwhile, the object group 210a and the object group 210c are displayed such that they are spread more in the y-axis direction than the object group 210b.

Such an arrangement can be used when, for example, an operation of interchanging the display positions of the objects 200 in the object group 210b or playing back the objects 200 in the object group 210b is permitted, while an operation of interchanging the display positions of the objects 200 in the object group 210a and the object group 210c is disabled and an operation of playing back the objects 200 in the object group 210a and the object 210c is permitted. In such a case, for the object group 210b that is spread in the x-axis direction, the y-axis direction, and the z-axis direction, the user U views the plurality of objects 200 using the depth, and performs an operation of selecting or playing back the objects 200, for example. Meanwhile, for the object group 210a and the object group 210c that are closed in the z-axis direction and spread in the y-axis direction, the user U views the plurality of objects 200 without using the depth, and performs an operation of selecting or playing back the objects 200, for example.

Figure 6:
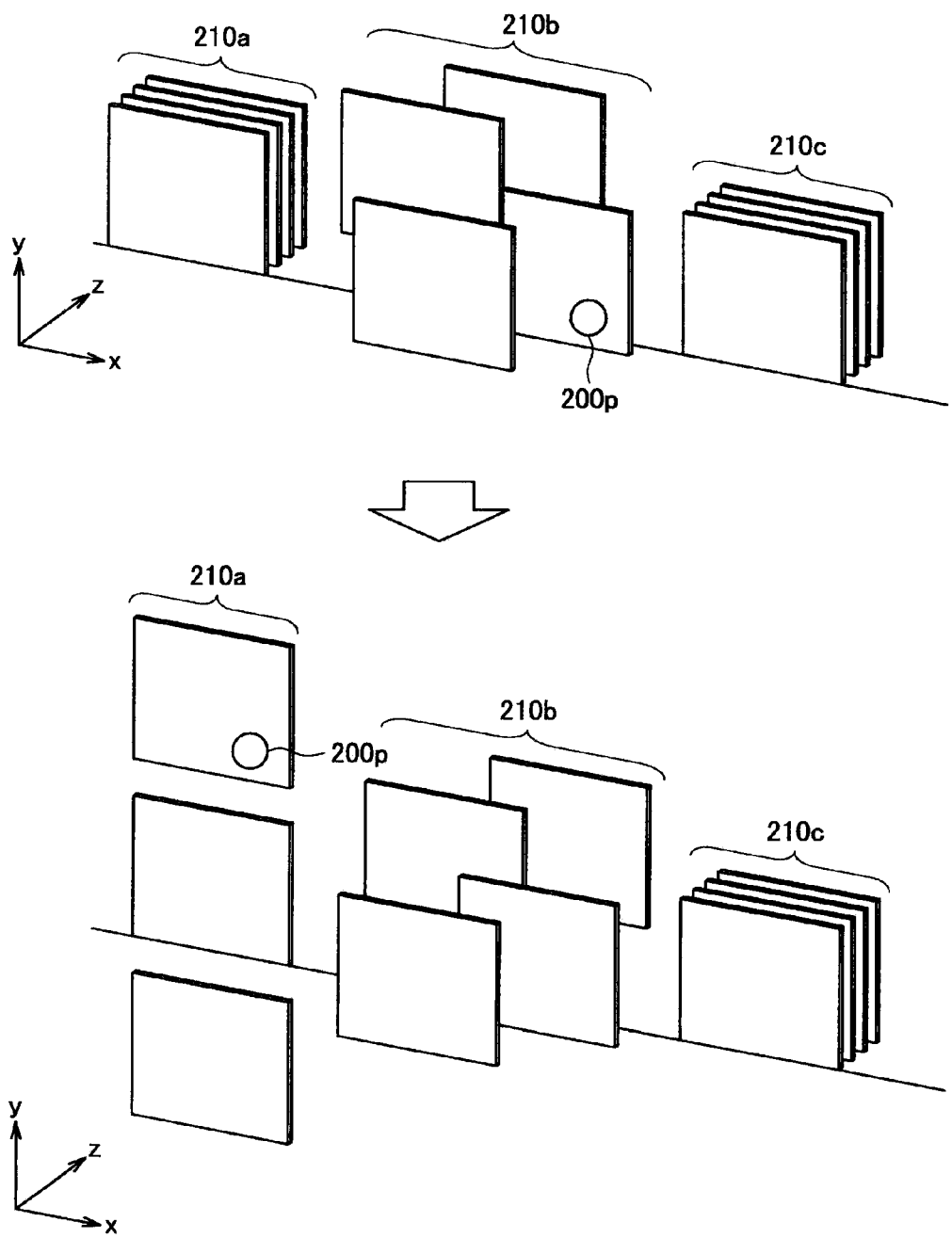
FIG. 6 is a diagram illustrating another variation of a display of objects with the information processing device in accordance with the first embodiment.

FIG. 6 is a schematic perspective view showing another variation of a display of the objects 200 with the information processing device 100 in accordance with the first embodiment of the present disclosure. In FIG. 6, the object groups 210a to 210c are displayed in the virtual three-dimensional space Sv, and states before and after an object group selected by the pointer object 200p changes are shown. Herein, the display control section 110, when the object 200 arranged in the peripheral region Rs is selected by the pointer object 200p, displays the objects 200 such that they are spread more in the y-axis direction than the objects 200 arranged in the center region Rc.

In the state before the change, the pointer object 200p is selecting the object group 210b located in the center region Rc of the virtual three-dimensional space Sv. As the object group 210b is located in the center region Rc, the object group 210b is displayed such that it is spread in the x-axis direction, the y-axis direction, and the z-axis direction. Meanwhile, the object group 210a and the object group 210c located in the peripheral regions Rs of the virtual three-dimensional space Sv are displayed such that they are closed in the x-axis direction, the y-axis direction, and the z-axis direction. The arrangement of the object groups 210a to 210c in the state before the change is similar to the arrangement of the objects 200 that has been described with reference to FIG. 4.

In the state after the change, the pointer object 200p has moved in response to an operation of the user U and is selecting the object group 210a located in the peripheral region Rs of the virtual three-dimensional space Sv. Herein, the object group 210a is displayed such that it is closed in the z-axis direction and is spread in the y-axis direction as with the arrangement of the object group 210a that has been described with reference to FIG. 5. The object group 210b is displayed such that it is still spread in the x-axis direction, the y-axis direction, and the z-axis direction as in the state before the change. The object group 210c is displayed such that it is still closed in the x-axis direction, the y-axis direction, and the z-axis direction as in the state before the change. As described above, in the present variation, a display of the object groups located in the virtual three-dimensional space Sv changes in accordance with the state of selection by the pointer object 200p.

Figure 7:
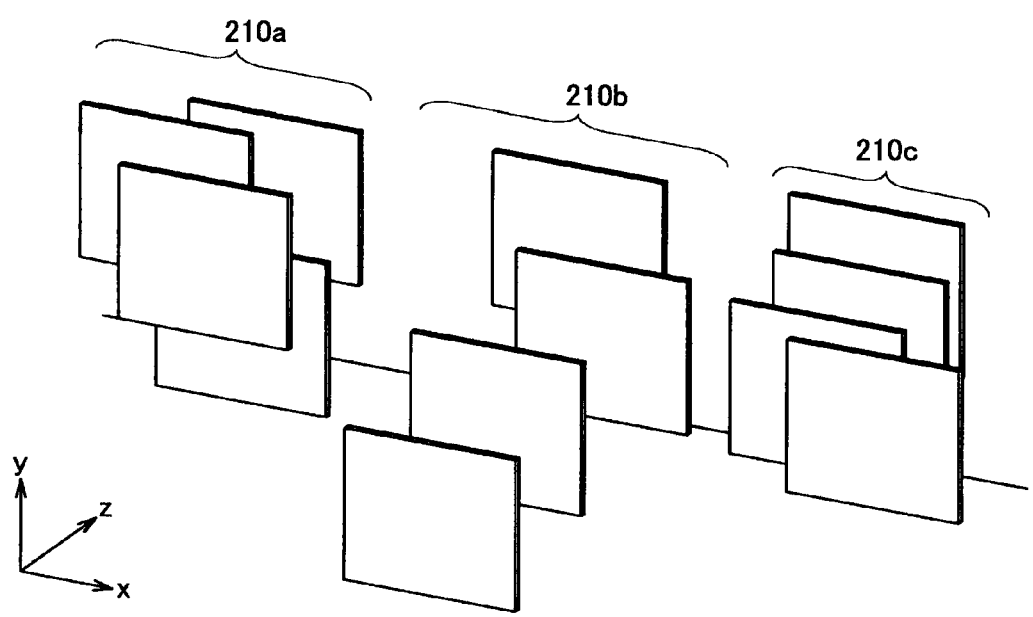
FIG. 7 is a diagram illustrating a still another variation of a display of objects with the information processing device in accordance with the first embodiment.

FIG. 7 is a schematic perspective view showing still another variation of a display of the objects 200 with the information processing device 100 in accordance with the first embodiment of the present disclosure. FIG. 7 shows a state in which the object groups 210a to 210c are displayed in the virtual three-dimensional space Sv. Herein, the display control section 110 displays the objects 200 arranged in the peripheral regions Rs such that they are spread in the x-axis direction or the y-axis direction in a similar manner to the objects 200 arranged in the center region Rc.

In the example shown in the drawing, the object group 210b is the object group located in the center region Rc of the virtual three-dimensional space Sv. In addition, the object group 210a and the object group 210c are the object groups located in the peripheral regions Rs of the virtual three-dimensional space Sv. The object group 210b is arranged such that it is spread in the z-axis direction, while the object group 210a and the object group 210c are arranged such that they are closed in the z-axis direction. Herein, the object groups 210a to 210c are displayed such that they are all spread similarly in the x-axis direction and the y-axis direction. That is, in the present variation, the object group located in the center region Rc of the virtual three-dimensional space Sv and the object groups arranged in the peripheral regions Rs differ in whether or not they are spread in the z-axis direction, but are common in that they are spread in directions other than the z-axis direction, namely, in the x-axis direction and the y-axis direction.

2. Second Embodiment

Next, the second embodiment of the present disclosure will be described. The second embodiment of the present disclosure differs from the first embodiment in that the virtual three-dimensional space includes middle regions, but the other functions and configurations are approximately the same as those in the first embodiment. Thus, detailed description thereof is omitted herein.

Herein, the virtual three-dimensional space Sv includes the center region Rc in which the objects 200 are displayed such that they are spread in the z-axis direction, and the peripheral regions Rs in which the objects 200 are displayed such that they are closed in the z-axis direction. If the center region Rc and the peripheral regions Rs are adjacent to each other, there is a possibility that when the objects 200 have moved from the center region Rc to the peripheral region Rs, the spread of the objects 200 in the z-axis direction may abruptly change, which can give a sense of discomfort to the user U. Therefore, in this embodiment, middle regions Rm are set between the center region Rc and the peripheral regions Rs.

(2-1. Display of Objects)

First, a display of objects with an information processing device in accordance with the second embodiment of the present disclosure will be described with reference to FIG. 8.

Figure 8:
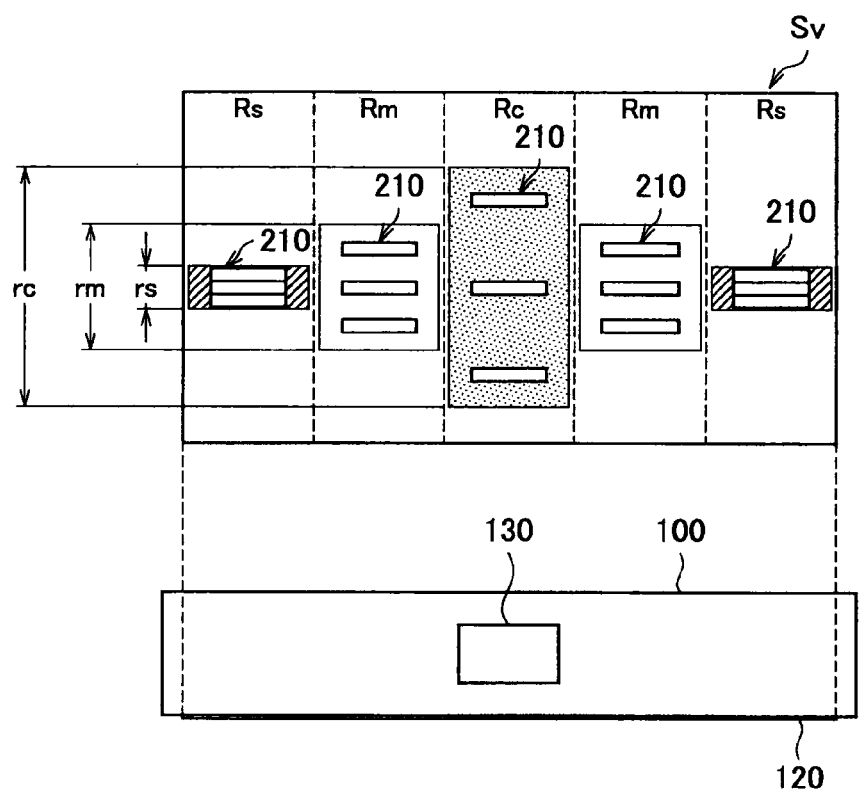
FIG. 8 is a diagram illustrating a display of objects with an information processing device in accordance with the second embodiment of the present disclosure.

FIG. 8 is a schematic top view showing a display of the objects 200 with the information processing device 100 in accordance with the second embodiment of the present disclosure. Referring to FIG. 8, the virtual three-dimensional space Sv displayed on the display screen 120 includes, in addition to the center region Rc and the two peripheral regions Rs, middle regions Rm that are located between the center region Rc and the peripheral regions Rs. The range of the z-axis direction in which the objects 200 are displayed in the middle regions Rm of the virtual three-dimensional space Sv is a third range rm. Herein, the third range rm is set between the first range rc and the second range rs.

Consider a case in which an object group 210, which is a set of a plurality of objects 200, is arranged in each of the center region Rc, the peripheral regions Rs, and the middle regions Rm as in the example shown in the drawing. In this case, with the setting of the middle regions Rm, the object groups 210 located in the middle regions Rm are spread more in the z-axis direction than the object groups 210 located in the peripheral regions Rs, and less in the z-axis direction than the object group 210 located in the center region Rc. That is, the object groups 210 located in the middle regions Rm are displayed such that the user U will feel a sense of depth that is about intermediate between those of the center region Rc and the peripheral regions Rs.

For example, consider a case in which the user U sequentially moves the object group 210 from the center region Rc to the middle region Rm and then to the peripheral region Rs in the virtual three-dimensional space Sv. In such a case, the expansion width of the object group 210 in the z-axis direction changes in stages from the state in which the object group 210 is spread to a large degree in the z-axis direction when located in the center region Rc to the state in which the object group 210 is spread to a lesser degree in the z-axis direction when located in the middle region Rm and then to the state in which the object group 210 is closed in the z-axis direction when located in the peripheral region Rs. When the middle regions Rm are provided as described above, the expansion width of the object group 210 in the z-axis direction is displayed such that it changes in stages as the object group 210 moves from the center region Rc to the middle region Rm and then to the peripheral region Rs, for example. Thus, a sense of discomfort of the user U caused by the change of the display of the objects 200 can be reduced.

(2-2. Variation)

Next, a variation of a display of the objects with the information processing device in accordance with the second embodiment of the present disclosure will be described with reference to FIGS. 9 and 10.

Figure 9:
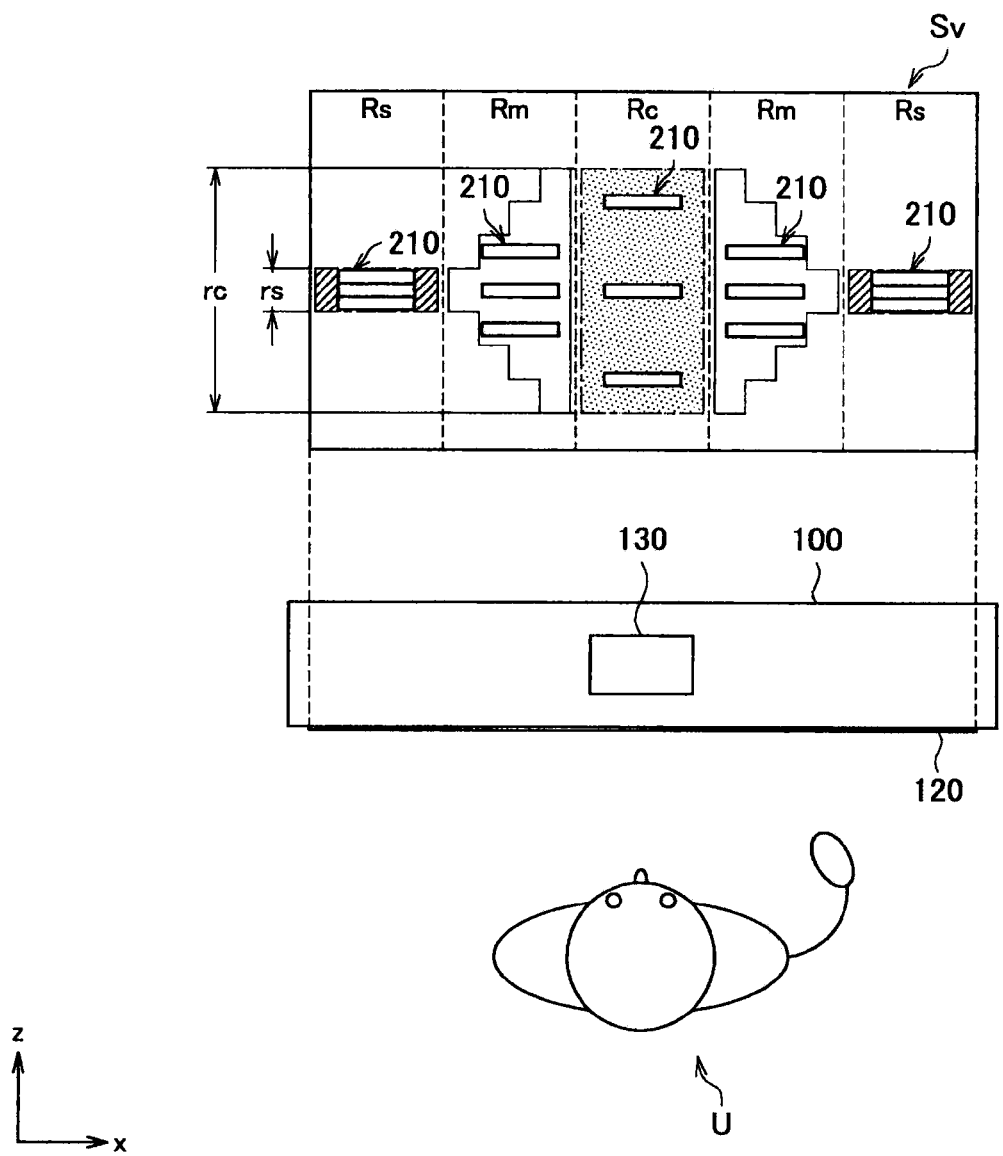
FIG. 9 is a diagram illustrating a variation of a display of objects with the information processing device in accordance with the second embodiment.

FIG. 9 is a schematic top view showing a variation of a display of the objects 200 with the information processing device 200 in accordance with the second embodiment of the present disclosure. Referring to FIG. 9, the range of the z-axis direction in which the objects 200 are displayed in the middle regions Rm of the virtual three-dimensional space Sv changes in stages between the first range rc and the second range rs.

With the aforementioned setting of the range of the z-axis direction in which the objects 200 are displayed in the middle regions Rs, when the object group 210 moves from the center region Rc to the middle region Rm and then to the peripheral region Rs, for example, the expansion width of the object group 210 in the z-axis direction will be displayed such that it changes in a greater number of stages than the case described with reference to FIG. 8. Thus, a sense of discomfort of the user U caused by the change of the display of the objects 200 can be further reduced.

Although the example shown in the drawing illustrates a case in which the expansion width of the object group 210 in the z-axis direction changes in four stages in the middle region Rm, the number of the stages is not limited thereto, and can be two stages or three stages, or five or more stages.

Figure 10:
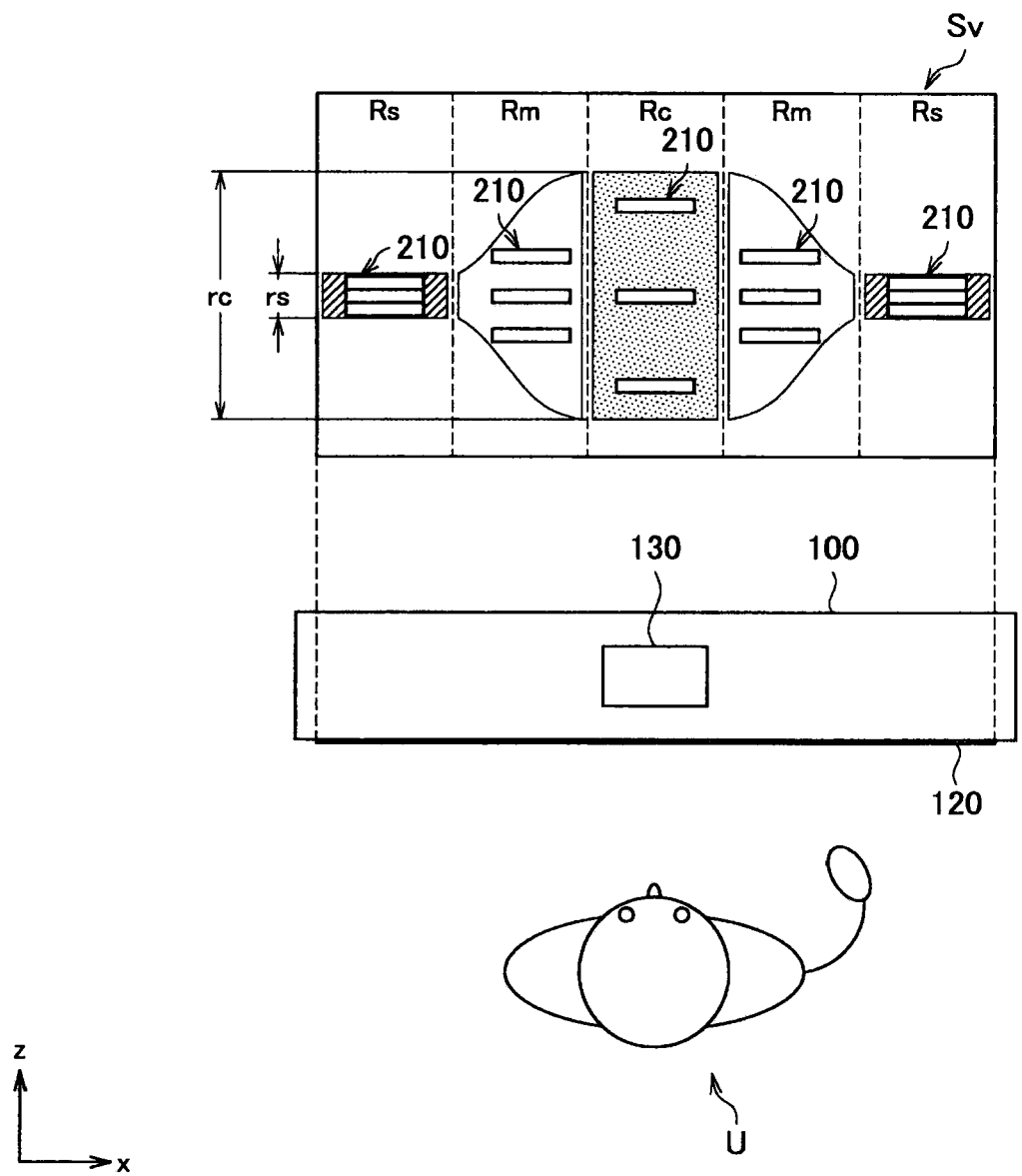
FIG. 10 is a diagram illustrating another variation of a display of objects with the information processing device in accordance with the second embodiment.

FIG. 10 is a schematic top view showing another variation of a display of the objects 200 with the information processing device 100 in accordance with the second embodiment of the present disclosure. Referring to FIG. 10, the range of the z-axis direction in which the objects 200 are displayed in the middle regions Rm of the virtual three-dimensional space Sv continuously changes between the first range rc and the second range rs.

With the aforementioned setting of the range of the z-axis direction in which the objects 200 are displayed in the middle regions Rm, when the object group 210 moves from the center region Rc to the middle region Rm and then to the peripheral region Rs, the expansion width of the object group 210 in the z-axis direction will be displayed such that it changes smoothly. Thus, a sense of discomfort of the user U caused by the change of the display of the objects 200 can be further reduced.

Although the example shown in the drawing illustrates a case in which the expansion width of the object group 210 in the z-axis direction changes in a sinusoidal manner in the middle regions Rm, the way in which the expansion width changes is not limited thereto, and any curved line such as a Bezier curve can be used. Alternatively, the expansion width can change linearly between the first range rc and the second range rs.

3. Third Embodiment

Next, the third embodiment of the present disclosure will be described. The third embodiment of the present disclosure differs from the first embodiment and the second embodiment in that the center region of the virtual three-dimensional space is set as a region corresponding to the position of the user with reference to the display screen, but the other functions and configurations are approximately the same as those in the first embodiment and the second embodiment. Thus, detailed description thereof is omitted herein.

Figure 11:
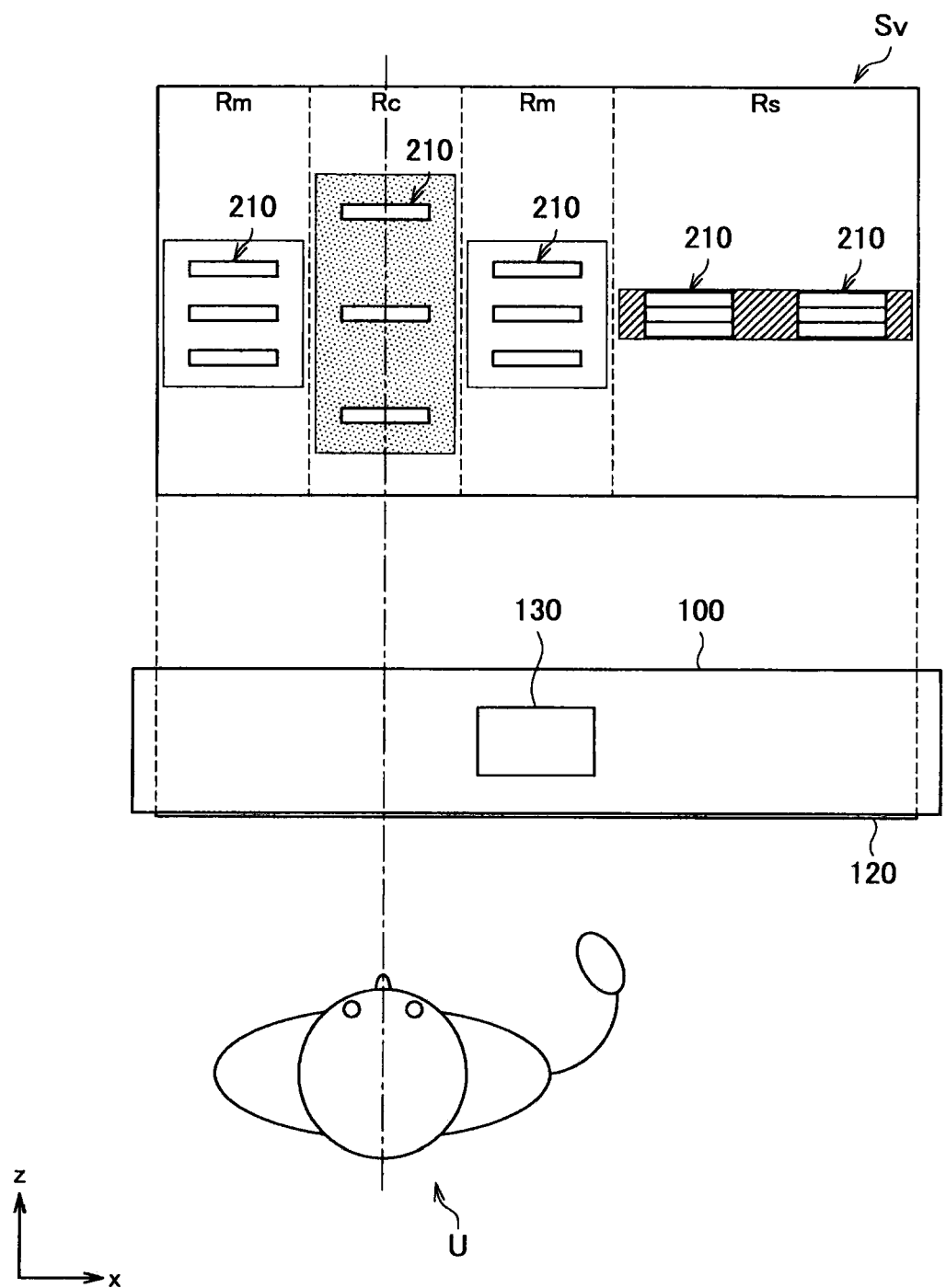
FIG. 11 is a diagram illustrating a display of objects with an information processing device in accordance with the third embodiment of the present disclosure.

FIG. 11 is a schematic top view showing a display of the objects 200 with the information processing device 100 in accordance with the third embodiment of the present disclosure. Referring to FIG. 11, the center region Rc of the virtual three-dimensional space Sv displayed on the display screen 120 is set as a region corresponding to the position of the user U with reference to the display screen 120.

In this embodiment, the acquisition section 130 of the information processing device 100 acquires the position of the user U with reference to the display screen 120 using a method that is similar to the method for acquiring the position of a body part that is used by the user U to perform an operation. In the virtual three-dimensional space Sv, the center region Rc is set using a position corresponding to the acquired position of the user U as the center. In addition, in the virtual three-dimensional space Sv, the peripheral region Rs is set on one or both side of the center region Rc in the horizontal direction. Further, the middle region Rm can be set between the center region Rc and the peripheral region Rs of the virtual three-dimensional space Sv.

In the example shown in the drawing, the position of the user U is shifted to the left with reference to the display screen 120. The acquisition section 130 recognizes a face of the user U, for example, and acquires the position of the face of the user U as the position of the user U. In the virtual three-dimensional space Sv displayed on the display screen 120, the center region Rc is set using a position corresponding to the acquired position of the user U as the center, and the peripheral region Rs and the middle region Rm are set based on the center region Rc. In the example shown in the drawing, the center region Rc is shifted to the left of the display screen. Thus, the peripheral region Rs is set on only the right side of the center region Rc. Although the middle regions Rm are set in the example shown in the drawing, the middle regions Rm need not be set.

As described above, in this embodiment, the center region Rc, the peripheral regions Rs, and the middle regions Rm are set corresponding to the position of the user U with reference to the display screen 120. That is, each region is set corresponding to the actual position of the user U. Therefore, even when the user U is located in a position shifted to the left or right with reference to the display screen 120, the center region Rc is set in a region where it is relatively easy for the user U to perform an operation in the z-axis direction, and the peripheral region Rs is set in a region where it is relatively difficult for the user U to perform an operation in the z-axis direction. Thus, it is possible to reduce a sense of discomfort felt by the user, which would be caused if a change of the display of the objects 200 in the z-axis direction in each region does not match the actual position of the user U, and thus to provide a more natural operation environment to the user U.

Figure 12:
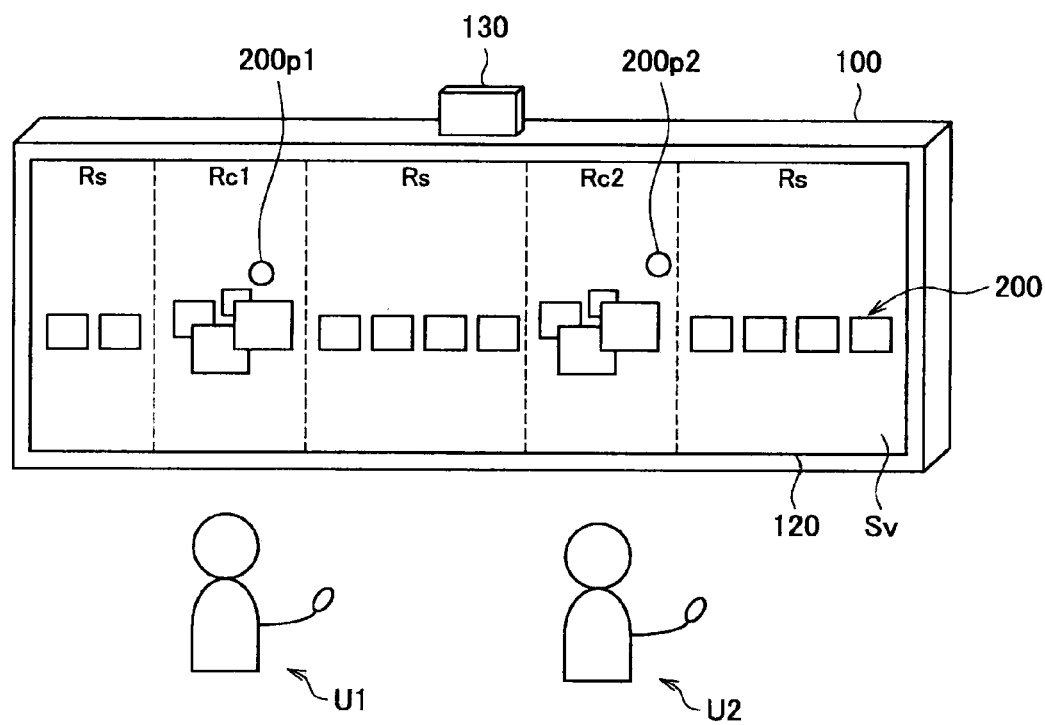
FIG. 12 is a diagram illustrating a setting of center regions for a plurality of users with the information processing device in accordance with the third embodiment.

FIG. 12 is a diagram illustrating a setting of a plurality of center regions for a plurality of users with the information processing device 100 in accordance with the third embodiment of the present disclosure. Referring to FIG. 12, a center region Rc1 and a center region Rc2 are set in the virtual three-dimensional space Sv, which is displayed on the display screen 120 by the information processing device 100, as regions corresponding to the positions of a user U1 and a user U2, respectively, with reference to the display screen.

In this case, the information processing device 100 can be a wide television, for example. The acquisition section 130 identifies a hand and a face of each of the user U1 and the user U2 using a method that is similar to the method for identifying a hand and a face of a single user U. Herein, the acquisition section 130 acquires the positions of the faces of the user U1 and the user U2 as the positions of the user U1 and the user U2, respectively. In addition, the acquisition section 130 can acquire a change in the position of the hand of each of the user U1 and the user U2 as an operation to be performed on the objects 200 by each of the user U1 and the user U2.

For example, each of the user U1 and the user U2 can move a pointer object 200p1 or a pointer object 200p2 by moving his/her hand in the horizontal direction, the vertical direction, and the front-back direction and can cause the pointer object 200p1 or the pointer object 200p2 to select and deselect another object 200 by performing operations of clenching and unclenching the hand. When one or both of the user U1 and the user U2 has/have moved position, the acquisition section 130 can acquire one or both of the positions of the user U1 and the user U2 again so that one or both of the center region Rc1 and the center region Rc2 can be reset. When the user U1 and the user U2 have moved closer to each other, the center region Rc1 and the center region Rc2 can be arranged adjacent to each other, and when the user U1 and the user U2 have further moved closer to each other, the center region Rc1 and the center region Rc2 can be combined. In addition, the number of the users U can be more than two.

4. Conclusion

In the aforementioned embodiment of the present disclosure, the information processing device 100 includes a display control section 110 configured to display objects 200 in a virtual three-dimensional space Sv, which includes the depth direction of a display screen 120, for example, and has a center region Rc and peripheral regions Rs located around the center region Rc, and an acquisition section 130 configured to acquire an operation on the objects 200 at least in the depth direction based on a movement of the body of the user. The range of the depth direction in which the objects 200 can be displayed is set to a first range rc in the center region Rc and to a second range rs that is narrower than the first range rc in the peripheral regions Rs. According to such a configuration, it is possible to induce the user to avoid an operation in the depth direction on the objects 200 that are located in the peripheral regions Rs of the virtual three-dimensional space Sv in which it is relatively difficult for the user to perform an operation in the depth direction. In addition, when the display control section 110 displays the virtual three-dimensional space Sv as a stereoscopic image, it is possible to reduce a burden on the visual perception of the user by displaying the image without much use of the depth in the peripheral regions Rs of the virtual three-dimensional space Sv in which a display of a deep image could cause a burden on the visual perception of the user.

The peripheral region Rs can be set on one or both side of the center region Rc in the horizontal direction of the display screen 120. According to such a configuration, it is possible to, when the acquisition section 130 acquires an operation using a body part that extends from the trunk in the horizontal direction such as a hand of the user, set the center region Rc and the peripheral region Rs according to whether or not it is relatively easy for the user to operate the objects 200 in the depth direction in each region.

The virtual three-dimensional space Sv can also include a middle region Rm between the center region Rc and the peripheral region Rs, and the range of the depth direction in which the objects 200 can be displayed in the middle region Rm can be set to a range between the first range rc and the second range rs. According to such a configuration, it is possible to change the display of the objects 200 in the depth direction in stages, for example, and thus to reduce a sense of discomfort of the user caused by the change of the display. In addition, it is also possible to induce the user to perform an operation in the range according to the easiness of the operation in the depth direction.

The range of the depth direction in which the objects 200 can be displayed in the middle region Rm can be set such that it changes in stages between the first range rc and the second range rs. According to such a configuration, it is possible to change the display of the objects 200 in the depth direction in a greater number of stages, for example, and thus to further reduce a sense of discomfort of the user U caused by the change of the display.

Alternatively, the range of the depth direction in which the objects 200 can be displayed in the middle region Rm can be set such that it changes continuously between the first range rc and the second range rs. According to such a configuration, it is possible to smoothly change the display of the objects 200 in the depth direction, for example, and thus to further reduce a sense of discomfort of the user U caused by the change of the display.

In addition, the second range rs can be set to zero. According to such a configuration, it is possible to induce the user to avoid performing an operation in the depth direction in the peripheral region Rs and to, even when an operation in the depth direction has been acquired, disable such operation.

The information processing device 100 can further include a notification section 140 configured to notify the user that an operation in the depth direction on one or more objects 200 located in the peripheral region Rs has been acquired. According to such a configuration, it is possible to, when the acquired operation in the depth direction has been disabled, notify the user to that fact, and to effectively induce the user to avoid operating the objects 200 in the peripheral region Rs in the depth direction.

The display control section 110 can display the plurality of objects 200 arranged in the center region Rc such that they are spread more in the horizontal direction or the vertical direction of the display screen 120 than the plurality of objects 200 arranged in the peripheral region Rs. According to such a configuration, it is possible to, when the objects 200 arranged in the peripheral region Rs are used as inactive objects 200, for example, induce the user not to operate the objects 200 in the peripheral region Rs.

Alternatively, the display control section 110 can display the plurality of objects 200 arranged in the peripheral region Rs such that they are spread more in the vertical direction of the display screen 120 than the plurality of objects 200 arranged in the center region Rc. According to such a configuration, it is possible to allow the user to view the plurality of objects 200 arranged in the peripheral region Rs using the vertical direction instead of the depth direction and to allow the user to operate each object 200.

The acquisition section 130 can acquire the position of the user with reference to the display screen 120, and the center region Rc can be set as a region corresponding to the position of the user. According to such a configuration, it is possible to set the center region Rc and the peripheral region Rs corresponding to the actual position of the user and to effectively induce the user to perform an operation in the depth direction in the center region Rc.

When the number of the user is more than one, the number of the center region Rc can also be set to more than one. According to such a configuration, it is possible to, when the information processing device 100 is operated by a plurality of users, for example, arrange the objects 200 for each user such the objects 200 are spread in the depth direction in a position where the objects 200 can be easily operated in the depth direction, and to induce each user to perform an operation in the depth direction in a region, which is suited to an operation in the depth direction.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although the aforementioned embodiments have illustrated cases in which the peripheral region in the virtual three-dimensional space is located on one or both side of the center region in the horizontal direction, the present disclosure is not limited thereto. For example, the peripheral region can be provided on one or both side of the center region in the vertical direction.

The present disclosure contains subject matter related to that disclosed in Japanese Priority Patent Application JP 2010-194109 filed in the Japan Patent Office on Aug. 31, 2010, the entire content of which is hereby incorporated by reference.

What is claimed is:

1. An information processing device comprising:
a display control section configured to display objects in a virtual three-dimensional space, the virtual three-dimensional space including a depth direction of a display screen that is a direction substantially perpendicular to the display screen, and having a center region configured to include a first plurality of objects being displayed therewithin and a peripheral region located around the center region and configured to include a second plurality of objects being displayed therewithin; and
an acquisition section configured to acquire an operation on the objects at least in the depth direction based on a movement of a body of a user,
wherein a selection is made between objects displayed at different positions along the depth direction of the virtual three-dimensional space, based on the movement of the body of the user in a real space along the depth direction to change at least a distance between a detected position of the body of the user and a location at which the objects are displayed,
wherein the range of the depth direction in which the first plurality of objects are displayed is set to a first range in the center region, and the range of the depth direction in which the second plurality of objects are displayed is set to a second range in the peripheral region, the second range being narrower than the first range,
wherein the range of the depth direction in which objects are displayed is set for respective regions around the center region to be narrower the farther the respective region is located from the center region,
wherein the objects in the center region are displayed in a stack, and
wherein the display control section and the acquisition section are each implemented via at least one hardware processor.

2. The information processing device according to claim 1, wherein the peripheral region is set on one or both sides of the center region in a horizontal direction of the display screen.

3. The information processing device according to claim 1, wherein
the virtual three-dimensional space has a middle region between the center region and the peripheral region, and
in the middle region, the range of the depth direction in which the objects are displayed is set between the first range and the second range.

4. The information processing device according to claim 3, wherein in the middle region, the range of the depth direction in which the objects are displayed is set such that the range changes in stages between the first range and the second range.

5. The information processing device according to claim 3, wherein in the middle region, the range of the depth direction in which the objects are displayed is set such that the range changes continuously between the first range and the second range.

6. The information processing device according to claim 1, wherein the second range is set to zero.

7. The information processing device according to claim 1, further comprising a notification section configured to notify the user that an operation in the depth direction on the objects located in the peripheral region has been acquired.

8. The information processing device according to claim 1, wherein the display control section displays the objects arranged in the center region such that the objects are spread more in a horizontal direction or a vertical direction of the display screen than the objects arranged in the peripheral region.

9. The information processing device according to claim 1, wherein the display control section displays the objects arranged in the peripheral region such that the objects are spread more in the vertical direction of the display screen than the objects arranged in the center region.

10. The information processing device according to claim 1, wherein
the acquisition section acquires a position of the user with reference to the display screen, and
the center region is set as a region corresponding to the position of the user.

11. The information processing device according to claim 10, wherein the number of the center region is set to more than one when the number of the user is more than one.

12. An information processing method comprising:
displaying objects in a virtual three-dimensional space, the virtual three-dimensional space including a depth direction of a display screen that is a direction substantially perpendicular to the display screen, and having a center region configured to include a first plurality of objects being displayed therewithin and a peripheral region located around the center region and configured to include a second plurality of objects being displayed therewithin; and
acquiring an operation on the objects at least in the depth direction based on a movement of a body of a user; and
selecting between objects displayed at different positions along the depth direction of the virtual three-dimensional space, by moving the body of the user in a real space along the depth direction to change at least a distance between a detected position of the body of the user and a location at which the objects are displayed,
wherein the range of the depth direction in which the first plurality of objects are displayed is set to a first range in the center region, and the range of the depth direction in which the second plurality of objects are displayed is set to a second range in the peripheral region, the second range being narrower than the first range,
wherein the range of the depth direction in which objects are displayed is set for respective regions around the center region to be narrower the farther the respective region is located from the center region, and
wherein the objects in the center region are displayed in a stack.

13. A non-transitory computer-readable medium having embodied thereon a program, which when executed by a computer causes the computer to execute a method, the method comprising:
displaying objects in a virtual three-dimensional space, the virtual three-dimensional space including a depth direction of a display screen that is a direction substantially perpendicular to the display screen, and having a center region and a peripheral region configured to include a first plurality of objects being displayed therewithin located around the center region and configured to include a second plurality of objects being displayed therewithin; and
acquiring an operation on the objects at least in the depth direction based on a movement of a body of a user; and
selecting between objects displayed at different positions along the depth direction of the virtual three-dimensional space, by moving the body of the user in a real space along the depth direction to change at least a distance between a detected position of the body of the user and a location at which the objects are displayed,
wherein the range of the depth direction in which the first plurality of objects are displayed is set to a first range in the center region, and the range of the depth direction in which the second plurality of objects are displayed is set to a second range in the peripheral region, the second range being narrower than the first range,
wherein the range of the depth direction in which objects are displayed is set for respective regions around the center region to be narrower the farther the respective region is located from the center region, and
wherein the objects in the center region are displayed in a stack.

14. The information processing device according to claim 1, wherein the range of the depth direction is a spacing in the depth direction between objects displayed at a same horizontal position and a same vertical position of the display screen.

15. The information processing device according to claim 1, wherein the range of the depth direction is a difference in depth between a first object displayed in the virtual three-dimensional space and located farthest in the depth direction, and a second object displayed at a same horizontal position and a same vertical position within the virtual three-dimensional space as the first object and located closest in the depth direction.

16. The information processing device according to claim 1, wherein at least one of the center region and the peripheral region comprises more than one of the objects being displayed to be overlapped within.

17. The information processing device according to claim 16, wherein the more than one of the objects are displayed to be planarly overlapped within at least one of the center region and the peripheral region.

18. The information processing device according to claim 1, wherein objects that are displayed in the peripheral region are arranged two-dimensionally.

19. The information processing device according to claim 1, wherein the movement of the body of the user in the real space along the depth direction effectuates a change in a currently selected one of the objects displayed at the different positions along the depth direction of the virtual three-dimensional space.

20. The information processing device according to claim 1, wherein a focus indicator is moved sequentially between ones of the objects displayed at the different positions along the depth direction of the virtual three-dimensional space, in correspondence with the movement and of the body of the user in the real space along the depth direction.

* * * * *